United States Patent [19]

Stokland

[11] 4,303,078

[45] Dec. 1, 1981

[54] AGRICULTURAL MACHINE

[75] Inventor: Sigmund Stokland, Holmestrand, Norway

[73] Assignee: Retford Sheet Metal Limited, Nottinghamshire, England

[21] Appl. No.: 119,005

[22] Filed: Feb. 5, 1980

[30] Foreign Application Priority Data

Feb. 6, 1979 [GB] United Kingdom ............... 04048/79

[51] Int. Cl.³ .............................................. A01F 7/04
[52] U.S. Cl. .................................. 130/27 J; 56/14.6; 130/27 P; 130/27 T
[58] Field of Search ............. 56/14.6, 220; 130/27 R, 130/27 F, 27 H, 27 HF, 27 HA, 27 J, 27 L, 27 P, 27 Q, 27 T, 27 AE, 27 JT

[56] References Cited

U.S. PATENT DOCUMENTS

| 89,669 | 5/1869 | Lee | 130/27 J |
|---|---|---|---|
| 666,654 | 1/1901 | Dingee | 130/27 J |
| 2,528,232 | 10/1950 | Krause | 130/27 JT |
| 2,589,440 | 3/1952 | Sharpe | 130/27 R |
| 2,910,819 | 11/1959 | Helliwell | 56/220 |
| 3,169,357 | 2/1965 | Suzue | 130/27 P |
| 3,412,735 | 11/1968 | Bechel et al. | 130/27 R |
| 3,794,046 | 2/1974 | Muijs | 56/14.6 |

Primary Examiner—Paul J. Hirsch
Attorney, Agent, or Firm—Cushman, Darby & Cushman

[57] ABSTRACT

There is described a harvester-thresher comprising one or more rotatably-mounted threshing cylinders and at least one cutting device positioned so as to act upon harvested crop before substantial threshing thereof has occured.

4 Claims, 4 Drawing Figures

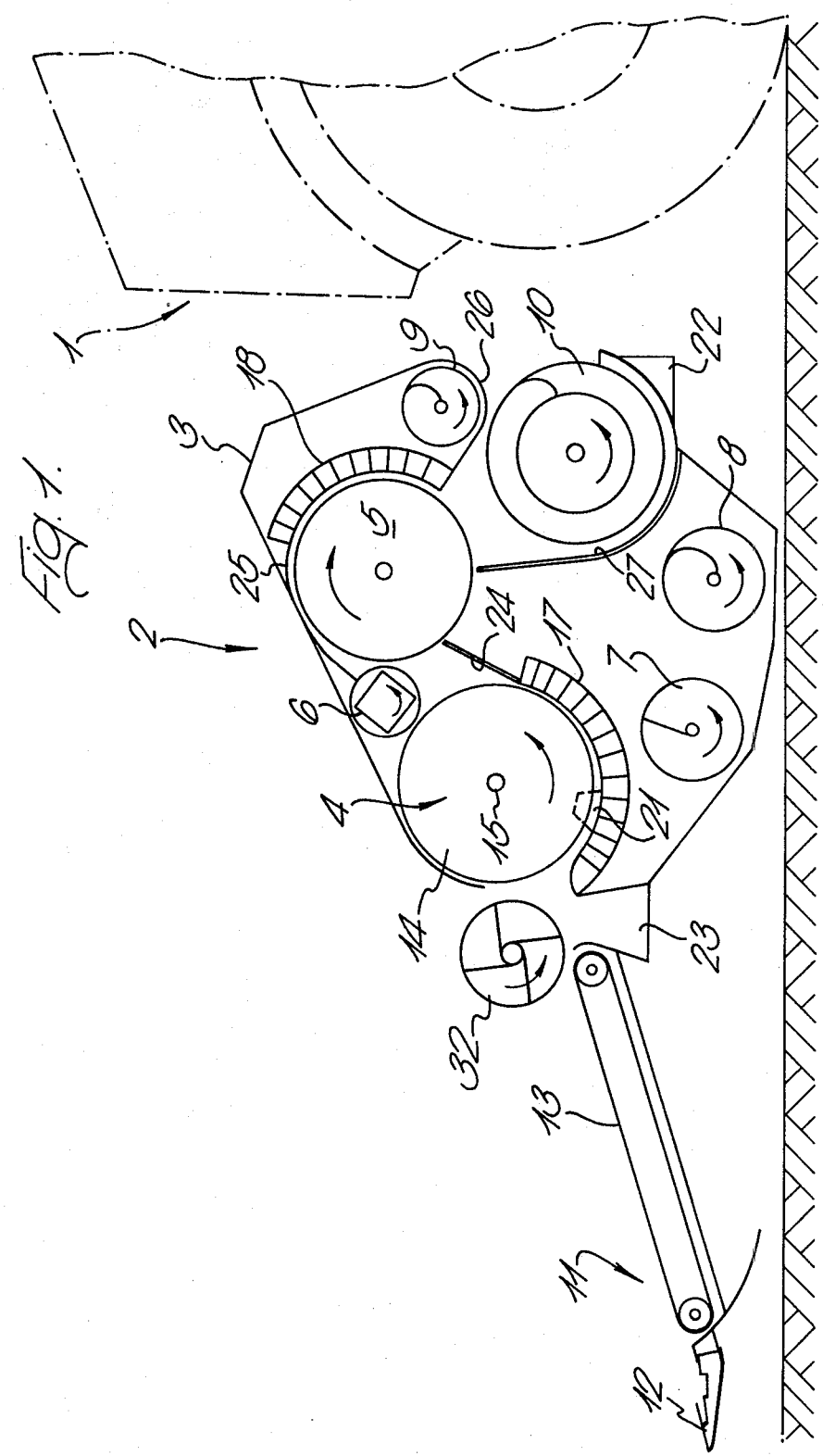

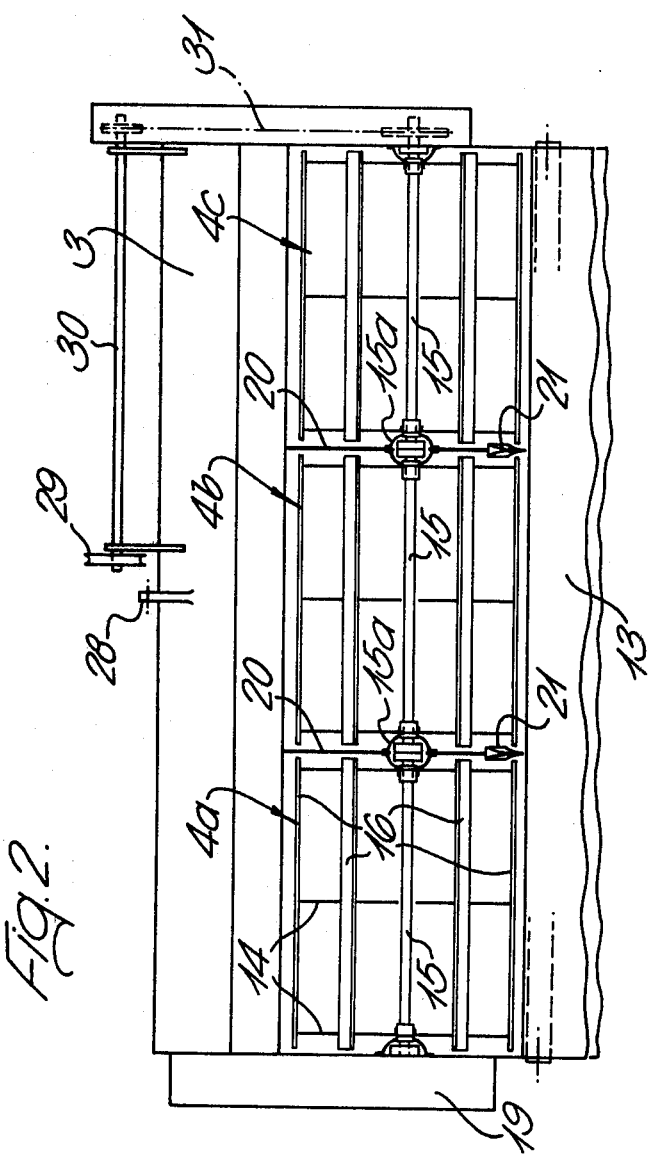

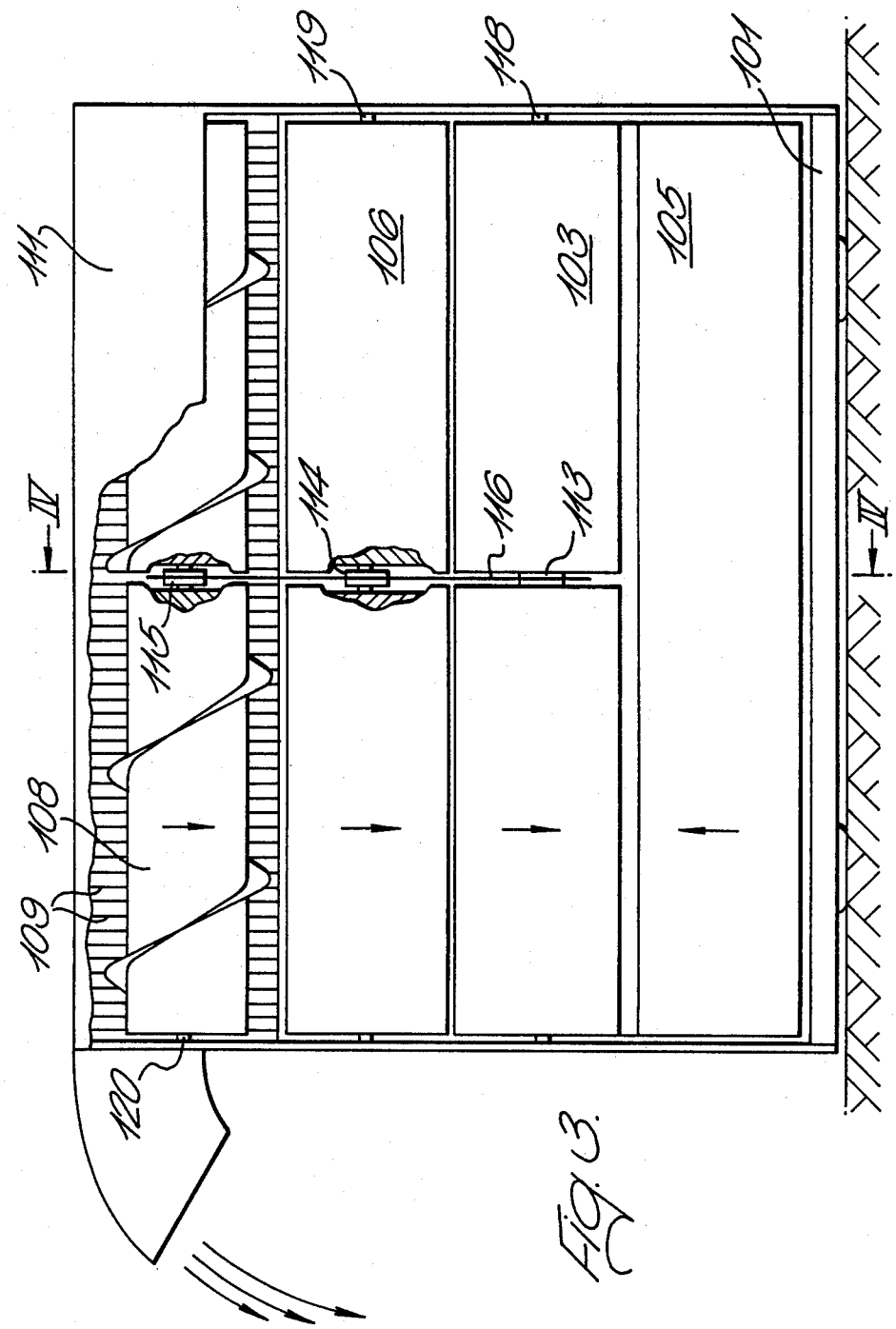

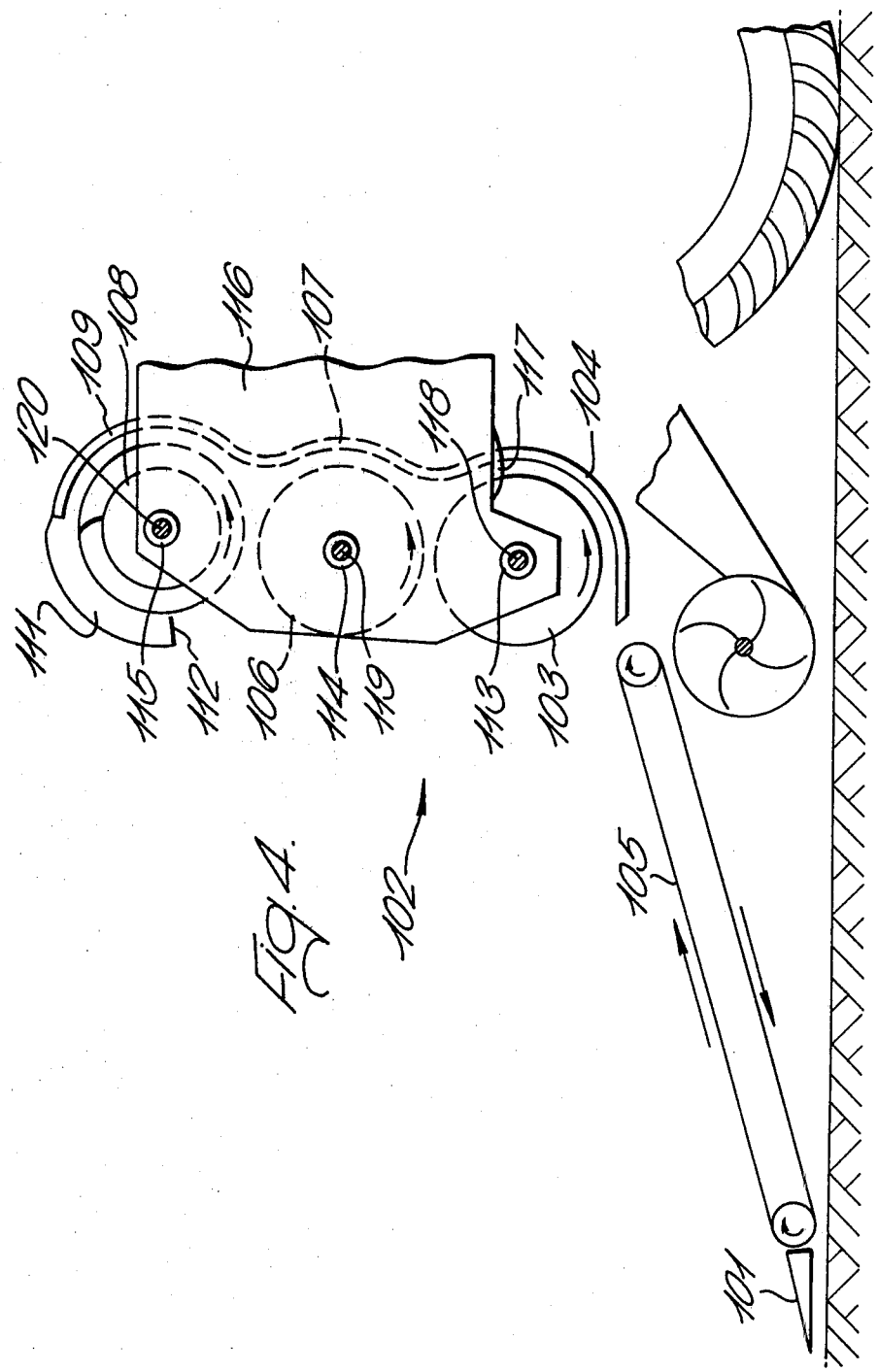

AGRICULTURAL MACHINE

This invention relates to agricultural machines especially combine harvesters, and more especially to machines for harvesting and threshing crop.

Conventional combine harvesters comprise a self-propelled vehicle having a crop-cutting or -harvesting mechanism at the front thereof. The crop as it is cut is conveyed into the body of the machine, the body containing at least one threshing means which separates the grain and chaff from the straw, the separated material then being cleaned, collected and removed as desired.

Broadly speaking, two types of harvester-thresher are generally known. In one, the width of the harvesting or cutting unit is relatively small and the stream of material to be threshed is fed to a threshing cylinder, straw cylinder and the like of about the same width as the harvesting unit. This type of machine suffers from the disadvantage that, although efficient threshing is possible, its threshing capacity is small because of the small width of the harvesting unit.

In a second known type of machine the width of the harvesting unit is relatively much greater than that in the first type of machine mentioned above, but despite the fact that it is thus possible to achieve harvesting of a relatively wider area of crop (a "full-width cut"), it is not possible to obtain a threshing function over the full width of cut (called hereinafter a "full-width thresh"). Because of this, it is conventional, when the crop is cut, to bulk it up by means of right- and left-hand augers so that the cut crop actually fed to the threshing stage of the operation is about one quarter to one third the width of the crop as cut. This also has disadvantages, since the consequently bulkier or thicker layer of crop fed to the threshing cylinder(s) is considerably more difficult to thresh, and thus the thresh is less efficient than is desired unless special auxiliary devices are used.

A harvester-thresher in which a full-width cut is associated with a full-width thresh is obviously a desirable item of manufacture, but hitherto it has not been possible to construct such a machine which will operate effectively. One possibility has been thought to involve the use of an extra long threshing cylinder, e.g. of the order of 3 meters or more in length, but the engineering problems associated with rapidly rotating long and heavy cylinders, mounted at both ends, for example the need to keep them sufficiently rigid, have been impossible to overcome in the context of a machine of this nature.

It was thought that these difficulties might be overcome by using two or more shorter, more rigid threshing cylinders linked together across the width of the machine to provide a full-width thresh, the shafts of the individual cylinders being supported at their adjacent ends in a bearing. This was found in practice, however, not to function efficiently, since the harvested crop tended to gather around the support for the bearings thus through build-up causing a blockage in feed, or to wind itself around the bearings and cylinder shaft ends and slow down, or prevent altogether, their rotation.

The primary object of the present invention is to provide a harvester-thresher which will permit both a full-width cut and a full-width thresh without being subject to the drawbacks detailed above.

According to the invention a harvester-thresher comprises one or more rotatably-mounted threshing cylinders and at least one cutting device positioned so as to act upon harvested crop before substantial threshing thereof has occurred.

The invention is applicable to the use, in a harvester-thresher, of either a long threshing cylinder or two or more relatively shorter threshing cylinders coaxially arranged and joined at their ends through bearings. In the former case, the shaft of the threshing cylinder may be supported, at spaced intervals, suitably by bearings and in the latter case the adjacent ends of the shafts may be supported in bearings. In each case the support may comprise a plate, fixed to the machine housing, carrying a cutting device, for example a knife blade, which acts upon the harvested crop before threshing has taken place to any substantial extent. It may be possible, in some cases, to dispense with the requirement for a separate cutting instrument, e.g. a knife blade. Thus, the support plates or partitions, or rather the leading edges thereof, may function as the cutting device, to cut the harvested crop before it has been threshed to any substantial extent. In this way there is little, if any, possibility of the harvested crop interfering with the rotation of the threshing occurs in the most advantageous manner.

It is a further feature of the invention that the threshing cylinder(s) and the cutting device(s) may be contained in a common housing which may, as desired, be attached to the front or the back of a tractor. This represents a further considerable advantage, since, bearing in mind the fact that combine harvesters are used only for a relatively short period during the year, it is of merit if the powered vehicle with which the harvesting and threshing functions are associated can be used for operations independent of harvesting.

It will thus be appreciated that the harvester-thresher of the invention may be releaseably attached to a self-propelled vehicle such as a tractor or other earth-working vehicle. An especially suitable vehicle for use with machines according to the invention is that sold by Mercedes-Benz under the trade name "Unimog". Many agricultural vehicles are available having means for coupling to ancillary equipment. Such vehicles may be used with the machine of the present invention.

Two embodiments of the invention will now be described by way of example only, with reference to the accompanying diagrammatic drawings, in which:

FIG. 1 is a side view of a threshing machine, showing the cutting and conveying mechanisms and the threshing means;

FIG. 2 is a front view of the threshing machine of FIG. 1 with part of the housing removed;

FIG. 3 shows a second form of harvester-thresher viewed from the front, and upper part being partially cut away; and FIG. 4 schematically shows a longitudinal section along line IV—IV in FIG. 3.

Referring to FIGS. 1 and 2, FIG. 1 shows the front end of a land vehicle 1 to which is removably attached (e.g. using a "category 3" three-point hitch) a threshing machine generally designated 2. The threshing machine 2 comprises a housing 3 in which are situated primary and secondary threshing cylinders 4,5 respectively, a beater 6, flipper 7, and discharge augers 8,9 and 10.

A cutting and conveying mechanism 11, attached at the front of housing 3 comprises a cutter 12, and conveyor 13, both extending the full width of the machine.

The housing 3 is suitably constructed of a steel framework (not shown for the purposes of convenience) to which are bolted various readily-removable steel plates. The threshing cylinders 4 and 5 may be of conventional construction, i.e. having a plurality of rasp-bars or pegbars attached to discs 14 fast on a shaft 15. FIG. 2 illustrates the primary threshing cylinder as comprising rasp-bars 16.

A stationary concave member 17 co-operates with primary threshing cylinder 4, and is adjustable with respect thereto. This adjustment is suitably effected at both the forward and rearward ends of the concave member. A second concave member 18 co-operates with the secondary threshing cylinder 5, and is suitably similarly adjustable.

The beater 6 and flipper 7 may be of conventional construction and are used in the conventional manner to assist movement of the threshed straw and grain/chaff respectively. Auger 8, which extends the full width of the machine, moves the grain and chaff which has collected in the bottom of the housing 3 to the side of the housing and into a collecting mechanism generally designated 19. This may for example include a belt or band conveyor, an air conveyor or a mechanical slinger, and may remove the grain/chaff to, for example, a cleaning unit and then a grain tank mounted on the rear of the vehicle. Alternatively it may simply bag the grain/chaff, or discharge it into a container, from which it is removed for subsequent separation and cleaning. Auger 9, which operates similarly to auger 8, removes from the machine, suitably also into discharge mechanism 19, grain and chaff which have passed through the concave 18.

With reference to FIG. 2, it will be seen that the primary threshing cylinder in fact is made up of three short cylinders, 4a, 4b and 4c, the shafts of which are rigidly connected together so that they rotate as one. Mountings for the ends of the shafts 15, comprising bearings 15a, are attached to plates 20 forming part of the framework of the housing 3. Plates 20 also mount knives 21, which cut the crop travelling into the machine from conveyor 13 into distinct portions. As mentioned previously, it may be possible to dispense with the knives 21, if the leading edges of the plates 20 themselves exert a sufficiently effective cutting action. The cutting and conveying mechanism is suitably of the "floating" type, the height of which may be adjusted by the operator of the machine.

The auger 10 comprises left and right-handed sections between which is a central paddle or mechanical fingers, and its purpose is to convey straw which has collected in the auger channel into the central discharge channel 22 and out through the rear of the machine.

The machine functions as follows. Crop is cut by the knife mechanism 12 (which may suitably comprise two sets of knife-edge teeth, one above the other, reciprocably moving against each other, or any other conventional cutting mechanism), and the cut crop moves onto the conveyor 13. The conveyor 13 transfers the crop to the front of the threshing machine 2, into which it is positively urged by feed beater 32 (FIG. 1), and the crop is divided into three distinct portions by means of the knives 21. A stone trap 23 collects stones and other solid objects as the crop bridges the gap between the top of conveyor 13 and the primary threshing cylinder 4. Threshing cylinder 4 rotates in a counter-clockwise direction so that the crop is passed between cylinder 4 and concave 17, and primary threshing takes place in the space. Separated grain and chaff fall through the apertures in the concave 17 into the lower part of the housing 3, and are moved therein by means of flipper 7 to discharge auger 8 and thereby out of the side of housing 3 into the discharge mechanism 19.

The material which is not passed through concave 17 is forced over a feed plate or comb 24 and around the secondary threshing cylinder 5, which is rotating in a clockwise direction. Back-feeding of the material around cylinder 4 is prevented by beater 6 which assists in directing the material between cylinder 5 and the curved cover-plate 25 to the secondary threshing cylinder 5. Secondary threshing takes place between cylinder 5 and concave 18, and grain and chaff which pass through concave 18 and collect in trough 26 at the rear of housing 3 are discharged therefrom by discharge auger 9 (again into the discharge mechanism 19). Material which has not passed through concave 18, and mostly comprising straw at this stage, falls into the discharge channel 22 and is removed from the centre thereof by the double-handed auger 10. Any grain or chaff which is still mixed with the straw at this stage may fall through a comb 27, which extends over the entire width of the machine, to be removed by the auger 8. Alternatively the comb 27 may be replaced with a plate, or similar curvature, which enables the grain still mixed with the straw to be removed at the rear of the machine.

Referring now to the embodiment shown in FIGS. 3 and 4, there is shown, at the front end, viewed in the driving direction, of a harvester-thresher 102 a harvesting unit 101. A conveyor belt 105 is connected to the harvesting unit 101 and leads backwards and upwards to a threshing cylinder 103 arranged with its horizontal longitudinal axis at right angles to the driving direction.

Two elongate straw cylinders 106,108 are arranged above the threshing cylinder 103 in such a way that the axes of the cylinders 103,106,108 of the respective cylinder shafts 118,119,120 are substantially parallel, with the second cylinder 108 being located above the first cylinder 106.

The threshing cylinder 103 and the two straw cylinders 106,108 are all rotatably connected to the frame of the harvester-thresher so as to rotate about the respective longitudinal axes, in the directions indicated by the arrows.

Behind the threshing cylinder 103 and the straw cylinders 106,108, and at a radial distance from the outer parts of the cylinders, there are located threshing cages 104,107,109 which are curved and joined to one another, follow parts of the outlines of the cylinders and cover sectors of the threshing cylinders and of the first and second straw cylinders 106,108.

The threshing cage 109 of the second straw cylinder 108 is constructed as a grid, the ribs of which are curved in planes at right angles to the axis of rotation of the straw cylinder 101 and are spaced out at intervals along the longitudinal direction of the drum.

The upper ends of the ribs are connected to a plate 111 which also is bent at a radial distance around the straw cylinder 108 and extends along the length of the latter; this plate covers a further sector of the straw cylinder 108 and terminates in a part 112 which runs radially towards the longitudinal axis of the straw cylinder 108 and forms a channel, running along the length of the straw cylinder 108, with the said cylinder. The second straw cylinder 108 is constructed in the manner of a screw conveying device or auger, i.e. with a spiral paddle running in the longitudinal direction.

The shafts 118,119,120 of the threshing cylinder 103 and of the straw cylinders 106,108 possess bearings not only at the ends but also at intermediate positions, see FIG. 3. These intermediate bearings 113,114,115 are firmly joined to the frame of the harvester-thresher by means of a bearing holder plate 116 arranged at right angles to the longitudinal direction of the cylinder axes. A knife 117 is fixed to the lower edge of this plate 116, principly between the threshing cylinder 103 and its threshing cage 104.

In operation the material to be threshed, cut off by the harvesting device 101, passes by means of the conveyor belt 105 to the threshing cylinder 103, which seizes the material to be threshed and projects it against the threshing cage 104, where a greater or lesser proportion, depending on the efficiency of the harvester-thresher, of the grain carried with the material is detached and passes through the threshing cage 104, whilst the straw is conveyed onwards, in the arc-shaped gap between the threshing cylinder 103 and the threshing cage 104, to the first straw cylinder 106.

The holder plate 116 for the middle bearings, which plate is located between the ends of the threshing cylinder 103, however projects, as already mentioned, through the gap present between the threshing cylinder 103 and its threshing cage 104, and at this point the straw flows past it. To avoid an accumulation of straw, which would otherwise build up transversely of the holder plate, a knife is fixed in this position, with its blade pointing upstream relative to the movement of the straw, so that the straw conveyed up against the blade is cut off. The straw cut in this way is conveyed by the first straw cylinder 106 along the corresponding threshing cage 107 until it reaches the second straw cylinder 108, in order to undergo additional threshing. The second straw cylinder is constructed in the manner of a screw conveyor. As a result of the arrangement, mentioned above, of the ribs of the threshing cage 104, however, axial displacement of the straw is substantially prevented, whilst displacement in the circumferential direction of the cylinder, and final threshing, is permitted.

When the straw reaches the channel formed by the straw cylinder 108 and the plate 111, the retaining action of the ribs of the threshing cage 109 ceases and the straw is transported out of the harvester-thresher, transversely to the driving direction of the latter. To facilitate the transport of the straw, this straw cylinder can be sloped slightly in the direction of the exit end.

It will be seen that the present invention provides a flexible and relatively inexpensive machine for the cutting and threshing of crops. It may be used with any land vehicle provided with suitable means for attachment, the upper attachment point on the housing 3 being indicated at 28 (FIG. 2). Suitably, the rotating parts of the machine, e.g. the cylinders 4 and 5, beater 6, flipper 7 and augers 8,9 and 10 in the FIGS. 1 and 2 embodiment, are driven by a common drive, which as shown diagrammatically in FIG. 2 comprises a pulley 29 driven by a belt from the land vehicle 1, a shaft 30 and a system of sprockets and chains, generally designated 31, the sprockets being mounted on the ends of the shafts of the various rotating devices. The embodiment of FIGS. 3 and 4 may be driven in analogous fashion. It will be appreciated that other drive means, such as a hydraulic motor, and a system of pulleys and belts rather than sprockets and chains, are suitable.

The main advantage of the machine of the invention stems from the fact that it permits a full-width thresh. This means that a substantially thinner layer of crop is treated by the threshing cylinders than is the case with conventional machines. This factor leads to a marked increase in efficiency of the threshing operation.

I claim:

1. A harvester-thresher comprising at least two coaxial, horizontal rotatably-mounted threshing cylinders mounted in the forward end of a housing and joined together through at least one bearing, a generally vertical plate supporting the bearing and provided with a cutting device positioned in the forward end of the housing so as to act upon harvested crop entering said forward end before the crop is acted on by the threshing cylinders.

2. A harvester-thresher as in claim 1 wherein the forward edge of the plate constitutes the cutting device.

3. A harvester-thresher as in claim 1 wherein the cutting device comprises a knife blade mounted on the plate.

4. A harvester-thresher as in claim 1, 2 or 3, wherein said plate is attached to said housing, and means for removing threshed material from said housing, said housing being adapted for releasable attachment to a movable vehicle.

* * * * *